US005661280A

United States Patent [19]

[11] Patent Number: 5,661,280
[45] Date of Patent: Aug. 26, 1997

Kuss et al.

[54] COMBINATION OF A GAS-FILLED INTERRUPTER AND OIL-FILLED TRANSFORMER

[75] Inventors: Arthur P. Kuss, Jefferson City, Mo.; William J. Book, Lake Mary, Fla.; Daniel H. Hickman, Florence, S.C.

[73] Assignee: ABB Power T&D Company Inc., Raleigh, N.C.

[21] Appl. No.: 510,586

[22] Filed: Aug. 2, 1995

[51] Int. Cl.$^{6}$ .......................... H01H 33/02; H01F 27/40; H02H 7/04

[52] U.S. Cl. .......................... 218/43; 218/84; 336/105; 361/38

[58] Field of Search .......................... 218/3, 43, 45, 218/57–67, 68–88, 91, 118; 200/17 R; 336/55, 57, 105; 361/35, 55, 40, 604–618, 38–44, 115

[56] References Cited

U.S. PATENT DOCUMENTS

| | | | |
|---|---|---|---|
| 919,563 | 4/1909 | Eveleth | 218/91 X |
| 2,048,496 | 7/1936 | Ehrenberg | 218/91 |
| 2,491,338 | 12/1949 | Smith, Jr. | 361/38 X |
| 2,918,557 | 12/1959 | Link | 337/194 |
| 3,628,092 | 12/1971 | Keto | 361/41 |
| 3,644,658 | 2/1972 | Kuti et al. | 174/17 LF |
| 3,819,892 | 6/1974 | Rathbun | 218/118 |
| 4,045,634 | 8/1977 | Nakano et al. | 218/75 |
| 4,110,578 | 8/1978 | Freeman et al. | 218/84 |
| 4,153,921 | 5/1979 | Kresge et al. | 361/40 |
| 4,214,119 | 7/1980 | Keen, Jr. | 174/31 R |
| 4,275,372 | 6/1981 | Eley | 337/4 |
| 4,484,169 | 11/1984 | Nishikawa | 336/57 |
| 4,536,659 | 8/1985 | Seitz et al. | 218/79 X |
| 4,621,561 | 11/1986 | Weldon | 218/91 X |
| 4,645,888 | 2/1987 | Barkan et al. | 218/57 X |
| 4,814,559 | 3/1989 | Stegmuller | 218/3 |
| 4,904,972 | 2/1990 | Mori et al. | 336/55 |
| 4,967,307 | 10/1990 | Itou et al. | 361/618 |
| 4,975,797 | 12/1990 | Veverka et al. | 361/35 |
| 5,023,415 | 6/1991 | Itoh et al. | 218/59 X |
| 5,151,565 | 9/1992 | Perret | 218/57 |

*Primary Examiner*—J. R. Scott
*Attorney, Agent, or Firm*—Woodcock Washburn Kurtz Mackiewicz & Norris LLP

[57] ABSTRACT

A gas-insulated switch for a distribution transformer and its associated electrical connections are located within a tank containing insulating and cooling oil for the transformer.

12 Claims, 8 Drawing Sheets

COMBINATION OF A GAS-FILLED INTERRUPTER AND OIL-FILLED TRANSFORMER

BACKGROUND OF THE INVENTION

1. Field of the Invention

The present invention relates to a novel combination of an interrupter switch and a distribution transformer and, more particularly, the combination of a gas-filled interrupter switch and an oil-filled distribution transformer, the switch being for controlling power to the transformer.

2. Description of the Related Art

When interrupting current to an inductive load, an arc forms between the separating switch contacts. For many years, the practice in the electrical power distribution industry has been the use of loadbreak switching in which contact arcing during current interruption occurs in an insulating fluid. The fluids historically in use, such as mineral and silicone oils, are limited in their arc-quenching capabilities and so are best suited to strictly insulating and cooling purposes. The existence and process of extinguishing the arc causes a breakdown of the insulating medium, general contamination from by-products of the fluid, and gas generation which raises the system pressure and may require venting of the enclosure. However, liquids are advantageous because of their low cost, ready availability and ease of handling and storage.

Gas insulation fluids have also been employed, for example, sulfur hexafluoride or $SF_6$, because it has certain qualities which are superior to air or oil. Gas insulation is disadvantageous, however, because of its costs and difficulty in handling and containment.

$SF_6$ is denser than air, non-flammable, chemically stable and inert at moderate temperatures. The electrical, thermal and chemical properties of $SF_6$ make it an effective insulator that is especially superior to air and comparable to oil at moderate operating pressures. Interrupting electrical load current in an atmosphere of $SF_6$ permits a greater energy interruption rating than is available with air in the same space. $SF_6$ is superior to oil in arc-quenching and arc-cooling capabilities. $SF_6$ at moderate pressure, for example, 2 atmospheres, provides a uniform insulative and thermally stable environment at all points within a container at equilibrium.

When electrical contacts are separated during loadbreak, $SF_6$ flows readily into the gap to insulate the gap as does any fluid. However, $SF_6$ has an additional advantage in that it is readily compressible. Thus, $SF_6$ can be forced to flow into the arc path, through one or more well known pressurization methods so that arc current is interrupted quickly and more efficiently than with common liquid insulators.

Unlike oil, by-products resulting from arc dissociation of the $SF_6$ gas tend to recombine into the gas after a short period of cooling, leaving little or no harmful residues in the system, causing minimal loss of insulation, and producing no requirement for venting. In addition, if extinguishing of the arc is delayed, the non-flammable character of $SF_6$ reduces any fire hazard.

Although $SF_6$ insulation has all the above-mentioned advantages, $SF_6$-insulated modules might sometimes leak, resulting in degraded operating characteristics and raising doubts as to the safety of the equipment. Leakage from large equipment enclosures for $SF_6$ equipment seems to be so common as to be a recognized liability during consideration of the acquisition of $SF_6$ equipment. Moreover, leaks are hard to detect because $SF_6$ is colorless, odorless, tasteless, and leaves no residue. Only pressure monitoring instrumentation provides clear evidence of leakage. Small encapsulated modules, however, such as self-contained switches, can be sealed well enough so that any leakage is rare, except in the case of damage. Damage which occurs prior to installation is usually obvious to the assembler, and therefore is a minimal problem.

As a static insulation fluid, $SF_6$ can be used satisfactorily in transformers. Although $SF_6$ has good thermal characteristics, it's suitability for use in distribution transformers for cooling, however, is impeded by the poor natural convection flow of the gas. Transformer coils insulated with $SF_6$ must be designed with an open structure and large ducts to allow easy passage of the gas, as in air-insulated, dry-type transformers, and may require forced circulation. This is a much less efficient use of space than immersion of the coils in liquid which is able to cool better due to the superior flow characteristics of liquids.

SUMMARY OF THE INVENTION

The foregoing disadvantages of destruction of fluids during switching and undetected loss of gas in enclosures is moderated or nullified in distribution transformers in accordance with the invention by a new system of enclosing small self-contained $SF_6$ gas-insulated switches and their interconnections within larger tanks filled with a conventional insulating and cooling mineral oil. This combination of two insulating systems obtains the maximum benefits of both while minimizing the shortcomings of both for their specific applications. All of the advantages of load switching in $SF_6$ gas are retained while the industry-standard bushings and conductors, and the switching modules themselves, are insulated and cooled by the long established benefits and economy of mineral oil liquid.

In accordance with the invention, a distribution transformer, which includes an enclosure containing an oil bath for cooling and insulating the windings of the transformer, is combined with a gas-insulated switch located in the oil bath. The switch, which may be a sulfur hexafluoride gas-insulated switch, controls the on/off state of the transformer and includes a controller for opening and closing the switch and electrical connectors which electrically connect the switch to the transformer and to the controller. The enclosure preferably is a tank having one or more walls with one or more fluid-tight bushings located in the wall or walls of the tank to allow for passage of the electrical connectors therethrough. A preferred switch includes a rotatable shaft operable by the controller, a lever which is connected at one end to the shaft and at another end to a movable contact or plunger. The plunger has a first arcing contact and a first main contact located on one end away from the lever. The lever is movable by the controller to cause the plunger to move from an open position to a closed position. The controller may include a motor connected to the lever by a rotatable shaft, and the electrical connectors may each be copper cable insulated with a paper sheath saturated with oil from the oil bath which may be either mineral oil or silicone oil.

Other features and advantages of the present invention will become apparent from the following description of the invention which refers to the accompanying drawings.

DETAILED DESCRIPTION OF THE PREFERRED EMBODIMENT

Figure 1:
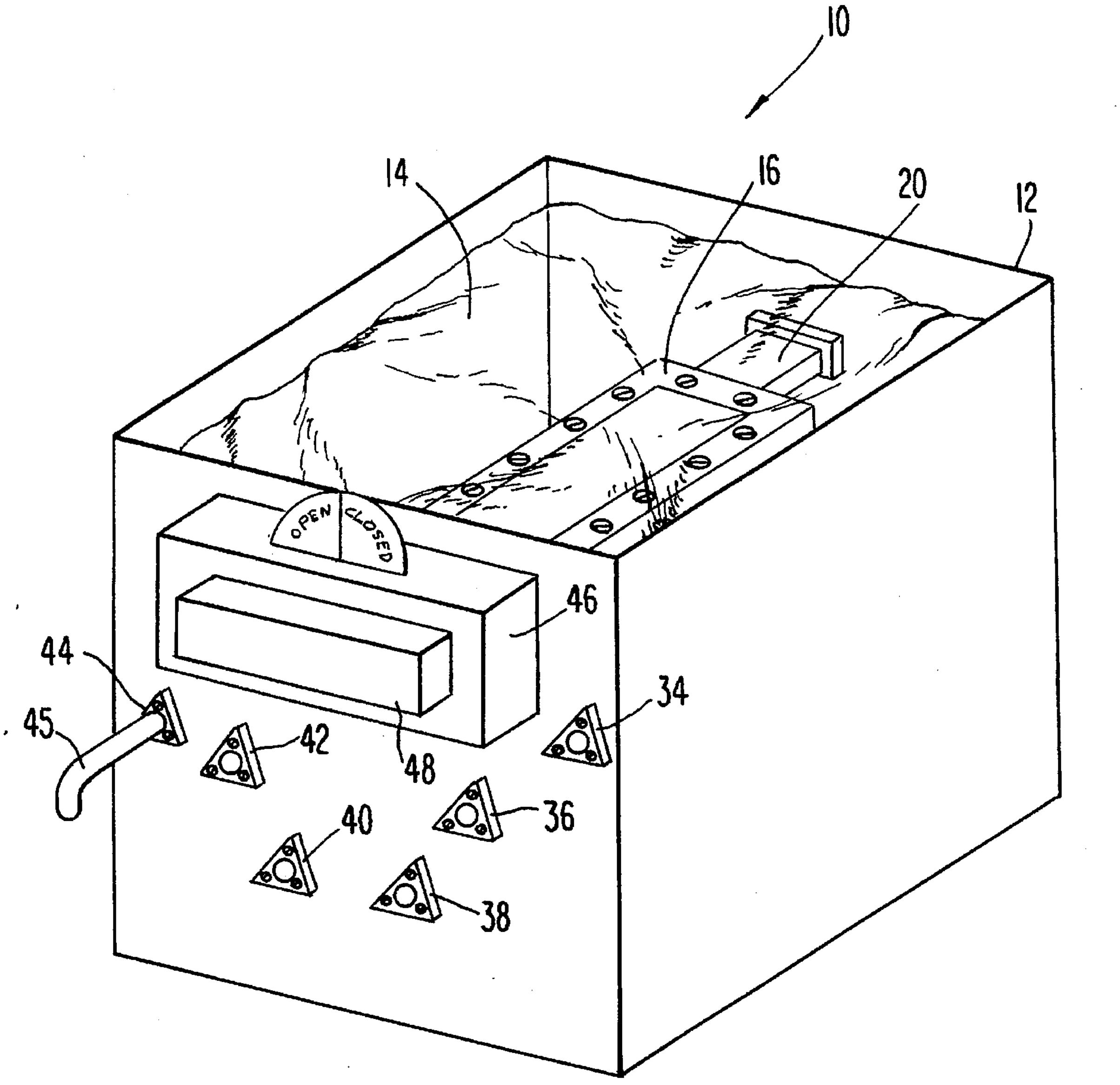
FIG. 1 is a perspective view of a tank containing insulating and cooling oil and having mounted therein a gas-insulated switch in accordance with the invention, a top and cabinet for the tank having been removed for clarity.

Referring now to the drawings wherein like numbers describe like elements throughout the several views, there is shown in FIG. 1 a system in accordance with the principles of the invention and designated generally as 10. System 10 includes a tank 12 which may have any suitable construction, such as welded joints and gasketed component seals. Tank 12 is shown in the drawings with a cabinet removed for clarity. The cabinet is used to protect the bushings and switch operator mechanisms from weather and tampering. An oil bath 14 is contained within tank 12. Oil bath 14 may be any conventional mineral oil or silicone oil bath used to insulate and cool transformer windings of a transformer (not shown) which is immersed in the tank.

Figure 2:
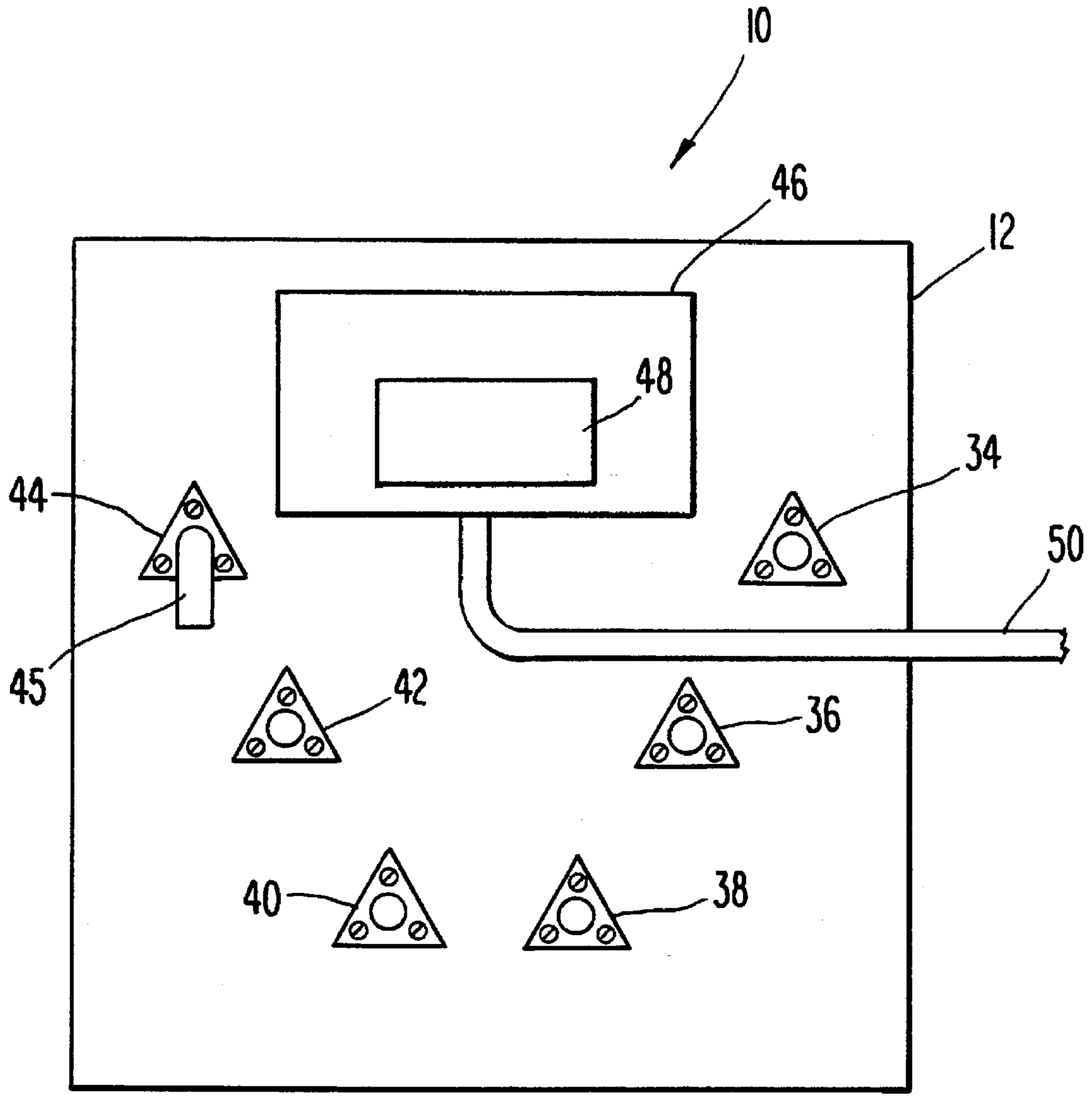
FIG. 2 is a front view of the tank.
Figure 3:
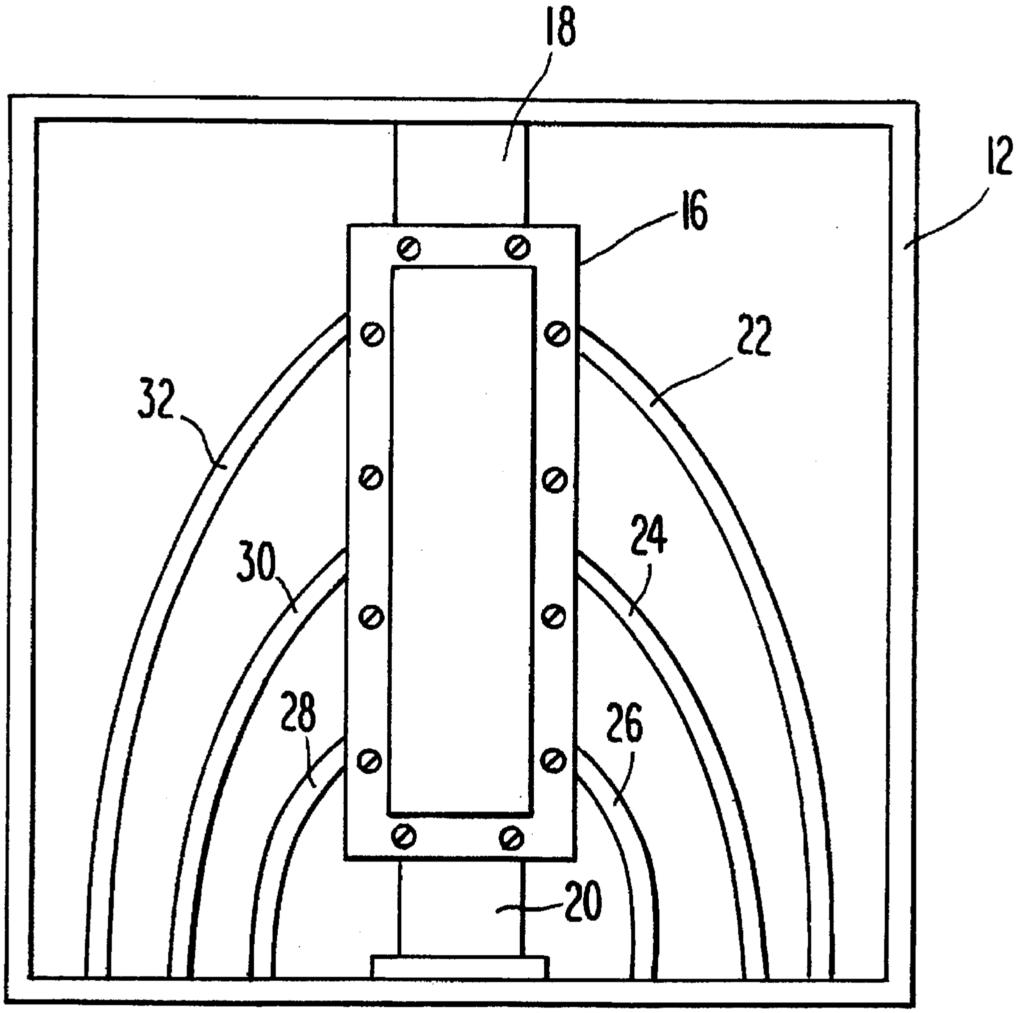
FIG. 3 is a top view of the tank.

Also, located within tank 12 and submerged in oil bath 14 is a gas-insulated switch 16 mounted to the interior of tank 12 by brackets 18 (seen in FIG. 3) and 20. Electrical connectors 22, 24, 26, 28, 30, and 32 (see FIG. 3) extend from switch 16 and pass through tank 12 at separable interface high voltage bushings 34, 36, 38, 40, 42, and 44. Associated with each of the bushings is an elbow connector 45 located on the outside of tank 12. Only one elbow connector is shown in FIGS. 1 and 2.

Motor 46 is mounted on the outside of tank 12 for controlling the operation of switch 16 between its open and closed positions. An output shaft of motor 46 extends through a suitable seal, later described, in the tank wall and is connected to the operating shaft of switch 16. Motor 46 includes conventional motor controls 48, which may be operated manually if necessary and power cord 50. Tank 12 may be mounted on an elevated platform (not shown) or other location with limited access to personnel.

Switch 16 may be any suitable gas-insulated switch device. A preferred switch is a three phase, 630A, 24KV, sulfur hexafluoride gas insulated switch produced by ABB Power T&D Company and available from ABB Distribusjon AS, P.O. Box 108, 3701 Skien, Norway. Similarly, electrical connectors 22, 24, 26, 28, 30, and 32 may be any suitable connectors and preferably, these connectors are conventional copper cables insulated in a paper sheath saturated with mineral oil. Other switches and electrical connectors for the switches will be apparent to one skilled in the art.

Preferably, switch 16 is remotely electrically operated from a distance using motor 46 and motor controls 48 which may be any suitable, conventional motor and control apparatus electrically powered through power cord 50. Alternatively, motor 46 and motor controls 48 could be replaced by a conventional hand operated lever (not shown), as mentioned above.

Figure 4:
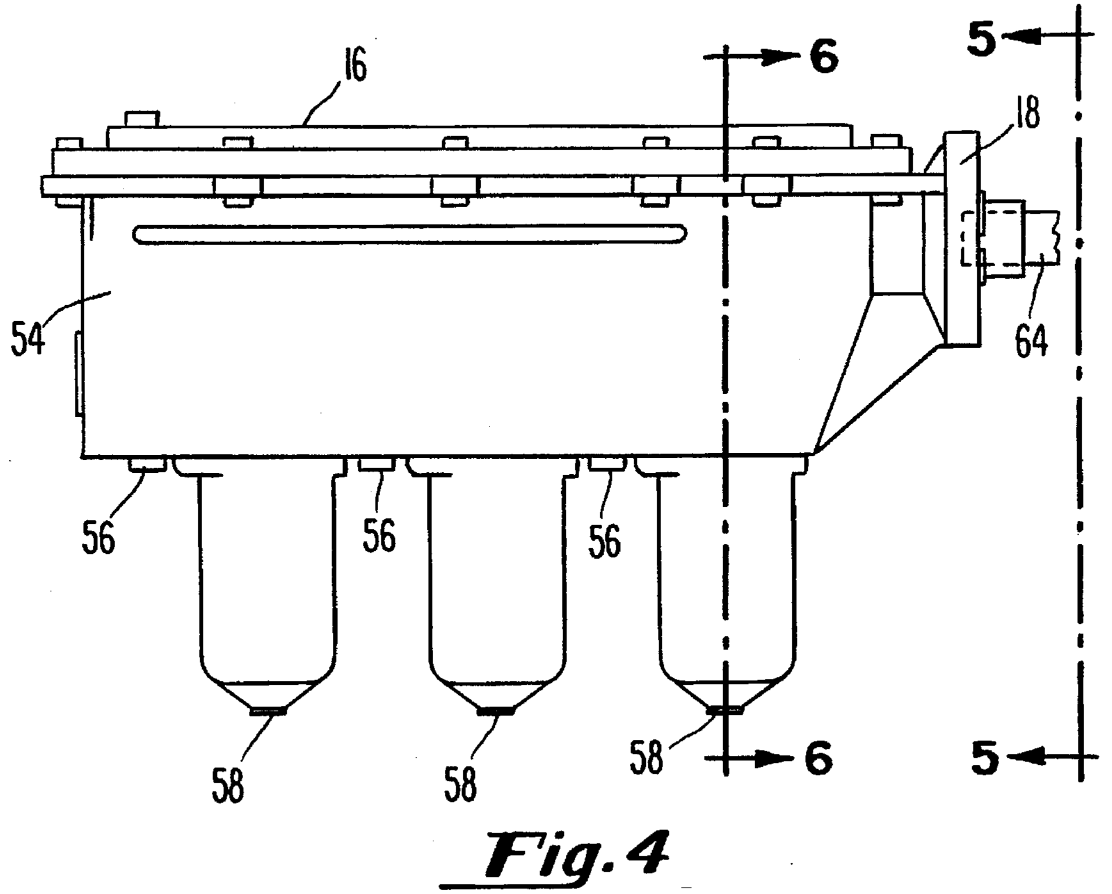
FIG. 4 is a side view of a preferred switch insulated in accordance with the invention.
Figure 5:
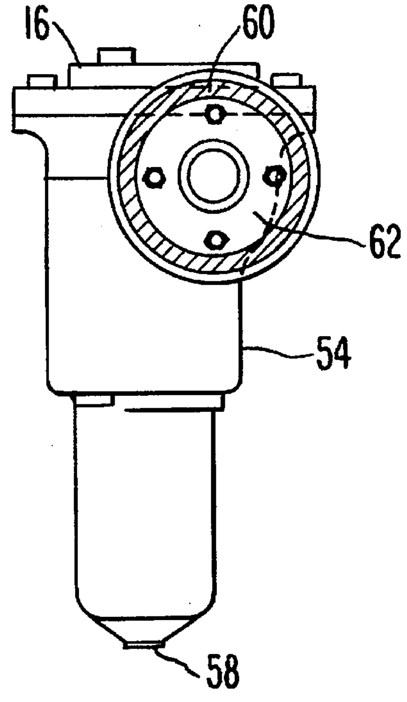
FIG. 5 is a front end view of the switch shown in FIG. 4 taken along section line 5—5 of FIG. 4.
Figure 6:
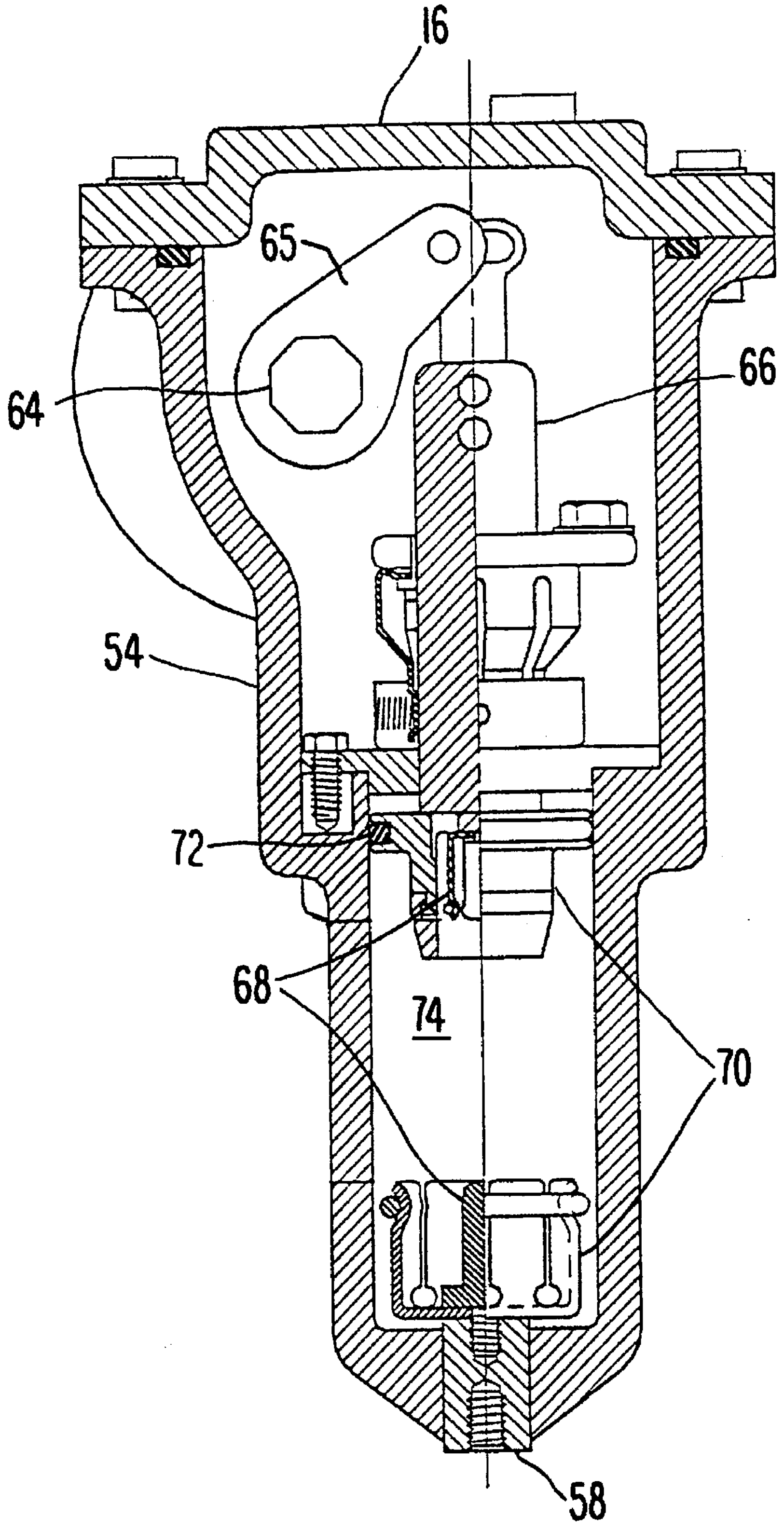
FIG. 6 is a cross-sectional view of one contact assembly taken along section line 6—6 of FIG. 4 and showing a portion of the contact assembly in cross-section.
Figure 7:
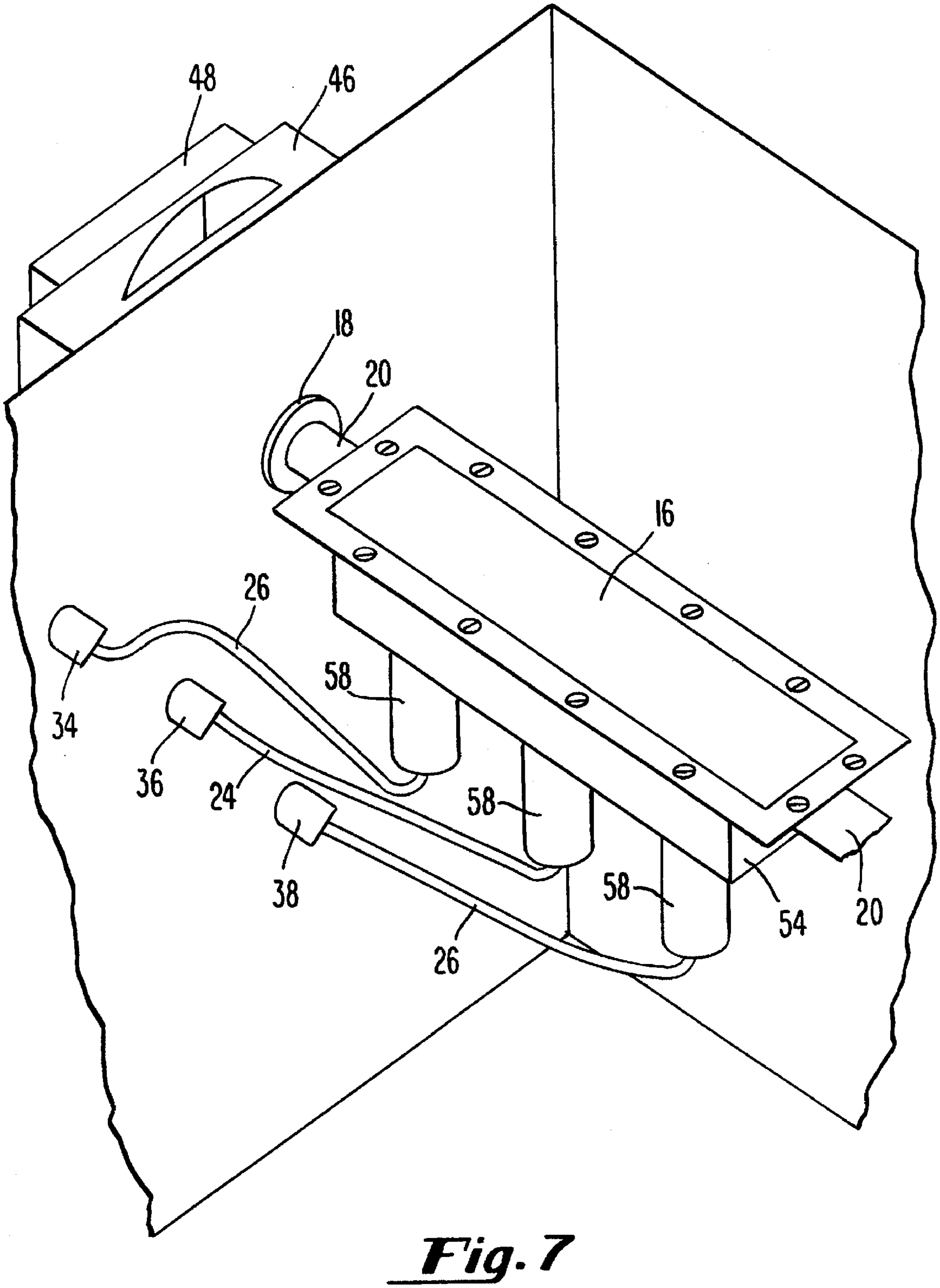
FIG. 7 is a cut-away perspective view of the tank showing the switch mounted to the tank.

Referring to FIGS. 4–6, there is shown a preferred $SF_6$ switch for controlling a transformer and for the insulation system of the invention. FIG. 7 shows the preferred $SF_6$ switch in tank 12. It will be understood that both switch 16 and an electrical transformer (not shown) are located within tank 12 and submerged in oil 14. The transformer may be any suitable transformer, such as a transformer for reducing a relatively high voltage (for example 7200 volts) to a relatively low voltage (for example 220 volts or 120 volts), and may be of the pad-mounted or pole-mounted type. Oil 14 insulates and cools the windings of the transformer as well as switch 16, connectors 22, 24, 26, 28, 30, and 32 and bushings 34, 36, 38, 40, 42, and 44.

Switch 16 includes epoxy housing 54 and moving contacts 56 and stationary contacts 58. Connectors 22, 24, and 26 may be connected to moving contacts 56 and connectors 28, 30, and 32 may be connected to stationary contacts 58. Mounting 18 is located at one end of switch 16 and includes an O-ring seal 60 and a mounting insert 62 for mounting to tank 12. A rotatable shaft 64 extends from motor 46 through a central region of mounting insert 62 and is in contact with lever 65. A plunger 66 is connected to lever 65 and is movable vertically in order to bring together and separate arcing contacts 68 and main contacts 70. A sliding gasket 72 is mounted peripherally on a lower region of plunger 66 and contacts an inner wall 74 of housing 54 forming a fluid-tight seal. Only one switch is shown in the drawings. It will be appreciated, however, that more than one switch 16 can be located in tank 12 as would be needed if there was more than one circuit involved, such as in a loop feed circuit.

Figure 8:
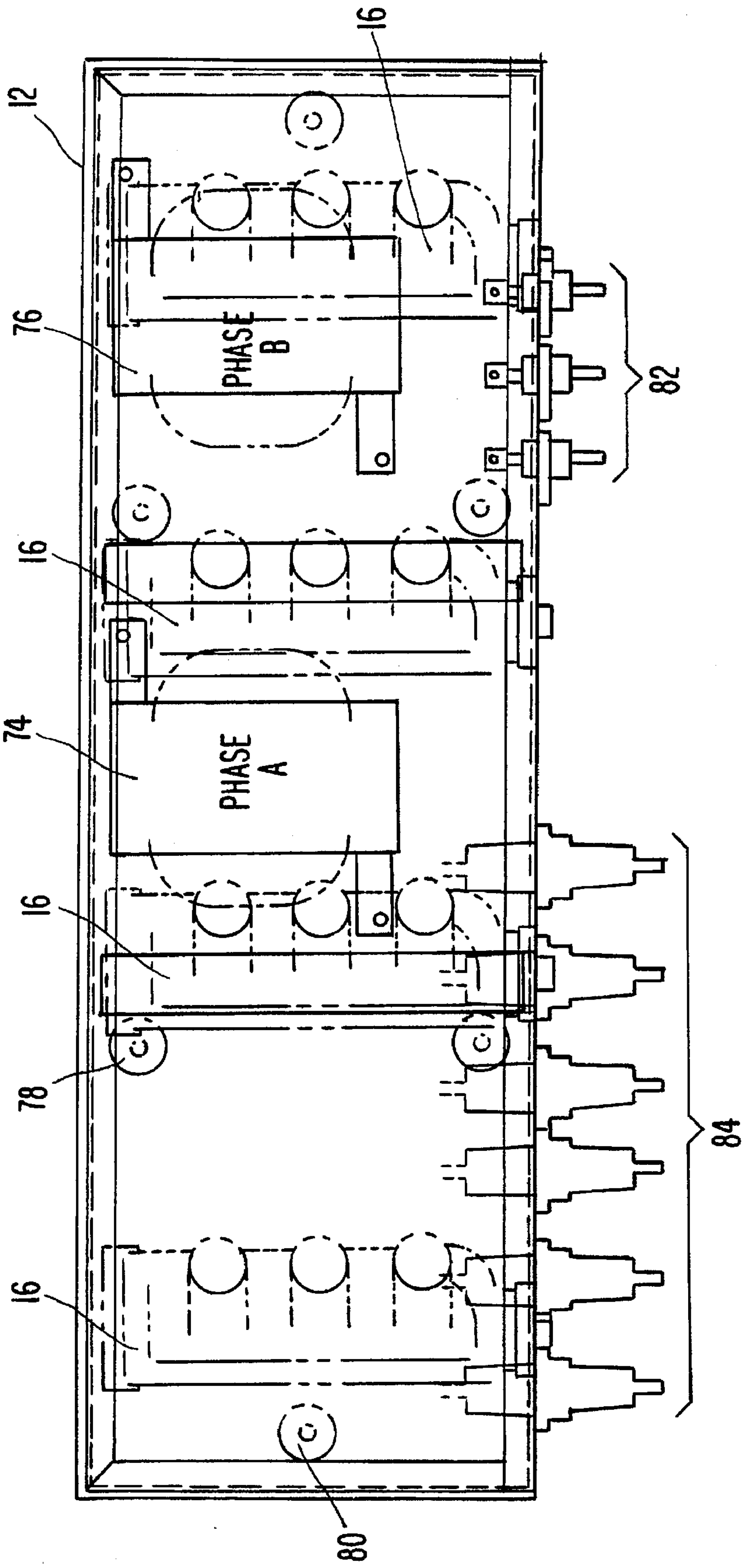
FIG. 8 is a top view of a tank in accordance with the invention containing four gas-insulated switch modules in a single tank.
Figure 9:
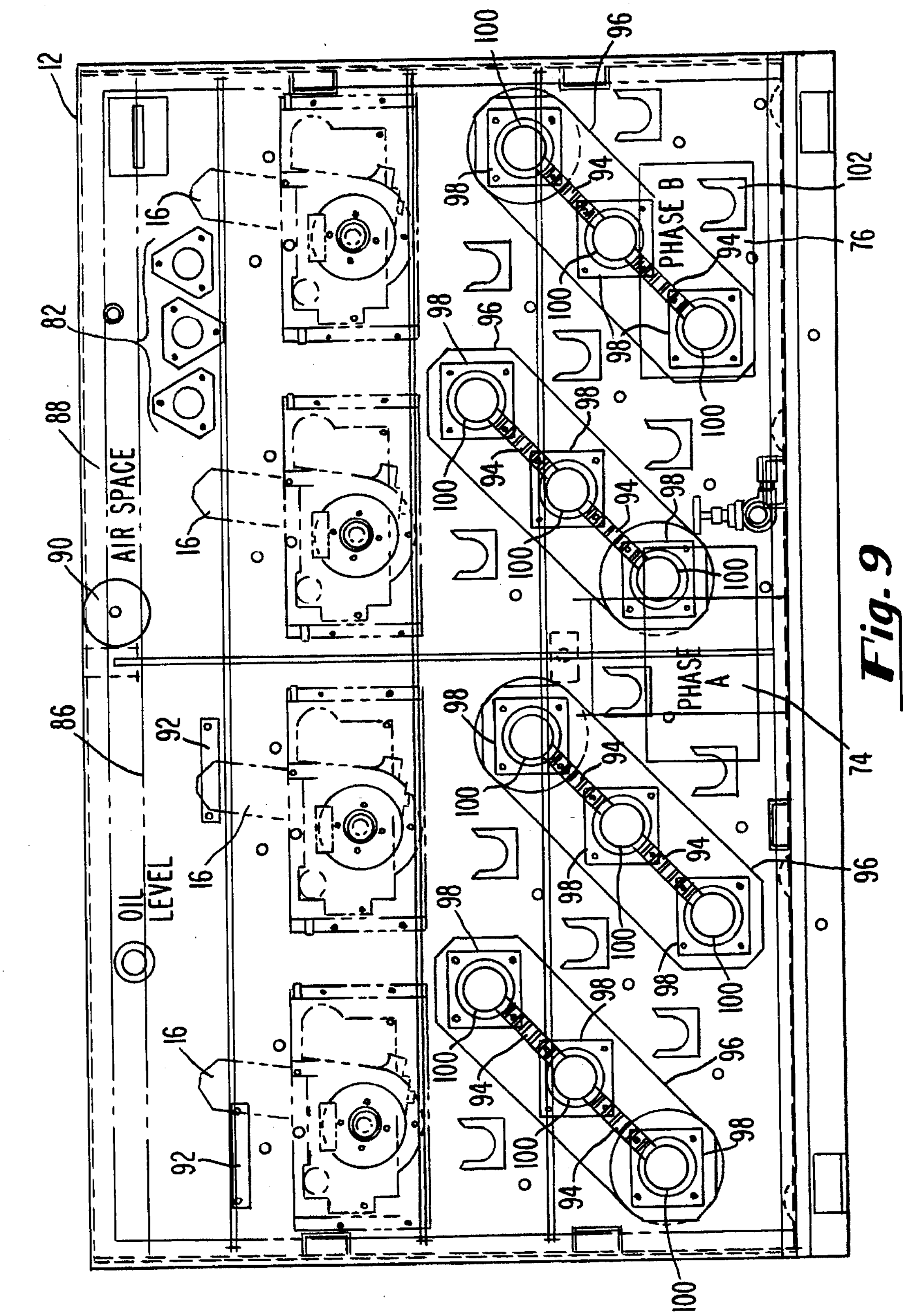
FIG. 9 is a side view of the tank shown in FIG. 8.

Referring now to FIGS. 8 and 9, there are shown top and side views, respectively, of tank 12 containing four gas-insulated switches 16. Switches 16 are shown upturned which allows an assembler easier access to the terminals of the switches. Transformers 74 and 76 are mounted on the bottom of tank 12 beneath the switches at mounting bosses 78 and 80. Each transformer 74 and 76 may be a single-phase core/coil assembly, and transformers 74 and 76 may be connected in a 2-phase, or duplex circuit. Of course, it will be understood to those skilled in the art that the tank 12 could instead include a single 3-phase core/coil transformer assembly which could be composed of three (3) sets of windings and a 3- or 5-legged core. Tank 12 may be installed in a 3-phase system, to be used primarily for feeder switching purposes. Transformers 74 and 76, for example, provide a low voltage output for control power and line monitoring at three low voltage bushings 82. High voltage input bushings 84 (not all shown) are provided on tank 10. This arrangement may be included in any one, two or three phase configuration or configurations, depending upon the intended use of the arrangement. All live parts in tank 10 are positioned inside of tank 10 below oil level 86 which forms an air space 88 with the top of tank 12. An air space pressure/vacuum gauge 90 is provided on tank 12. Manual switch handle storage brackets 92 are located on tank 12 for when switches 16 are upturned as discussed above. Slots 94 are cut out between holes in the wall of tank 12 for the bushings in order to prevent eddy currents in the steel wall of tank 12 between bushings. Welded-on, non-magnetic plates 96 mount to high voltage bushings 84 and also suppress the eddy currents mentioned above, and flange mounting stud bolt circles 98 are located on plates 96 at bushing mounting holes 100 in plates 96. Parking stands 102 are provided on tank 12 for the elbow connectors 45.

An advantage of the insulating mediums $SF_6$ and mineral oil is that the two will not react harmfully with each other should there be leakage in the switch module. It will be understood that alternate combinations of insulation mediums may be selected to maximize their merits in appropriate applications. Different types and mixtures of gases are available, such as nitrogen with sulfur hexafluoride, as well as different types of oil, such as silicone oil. The selection of the particular gases and oils depends upon the intended service of the system, including the ambient temperature, the operating voltages and currents, and available fault energies. Since the loadbreak is totally contained within the $SF_6$ switch, the entire unit will have a longer service life, greater reliability, and be less polluting than comparably-rated transformers featuring one type of insulating system.

Manufacturing facilities designed and built to produce insulated electrical apparatus naturally operate within their own specialty, not normally extending their activities or product lines into other materials or methods in which they have not historically developed expertise. The present inventive concept combines two diverse technologies to result in an unexpectedly optimal combination.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. In combination:

a distribution transformer comprising a core and at least one winding;

a load break switch having a pair of contacts movable between an open and a closed position; said pair of contacts connected in series with said winding;

a sealed gas-filled enclosure for said load break switch;

an oil-filled enclosure; said distribution transformer and said load break switch both being immersed within the oil of said oil-filled enclosure and being connected together within said oil-filled enclosure;

and an operating mechanism connected to said pair of contacts and being operable from the exterior of said oil-filled enclosure.

2. The combination of claim 1, wherein said oil-filled enclosure comprises a tank having at least one wall.

3. The combination of claim 1, wherein said switch is a sulfur hexafluoride gas-insulated switch.

4. The combination of claim 3, wherein said switch comprises a rotatable shaft operable by said operating mechanism, a lever connected to said shaft, a plunger having a first arcing contact and a first main contact both located on one end of said plunger away from said lever, and a second arcing contact and main contact, said lever being movable by operation of said operating mechanism to cause said plunger to move from a open position wherein said arcing and main contacts are separated and a closed position wherein said arcing and main contacts are in electrical contact.

5. The combination of claim 4, wherein said operating mechanism comprises a motor connected to said rotatable shaft, said motor being operable to cause said plunger to move from said open position to said closed position.

6. The combination of claim 1, further comprising electrical connector means located between said pair of contacts and said winding.

7. The combination of claim 1, wherein said oil is selected from the group consisting of mineral oil and silicone oil.

8. In a distribution transformer including a tank and an oil bath located in the tank for insulating and cooling the transformer, the improvement comprising a gas-insulated switch located in the oil bath and electrically connected to the transformer for controlling the on/off state of the transformer, the switch having electrical connector means associated therewith and control means extending through said tank and operable from the exterior of said tank for opening and closing the switch.

9. The transformer of claim 8, wherein the gas-insulated switch is a sulfur hexafluoride gas-insulated switch.

10. The transformer of claim 9, wherein the switch comprises a rotatable shaft operable by the control means, a lever connected to the shaft, a plunger having a first arcing contact and a first main contact both located on one end of the plunger away from the lever, and a second arcing contact and main contact, the lever being movable by operation of the control means to cause the plunger to move from a open position wherein the arcing and main contacts are separated and a closed position wherein the arcing and main contacts are in electrical contact.

11. The transformer of claim 10, wherein the control means comprises a motor connected to the rotatable shaft, the motor being operable to cause the plunger to move from the open position to the closed position.

12. The transformer of claim 8, wherein each electrical connector means comprises a copper cable having a paper sheath located thereon, the paper sheath being saturated with oil from the oil bath.

* * * * *